United States Patent Office 3,433,733
Patented Mar. 18, 1969

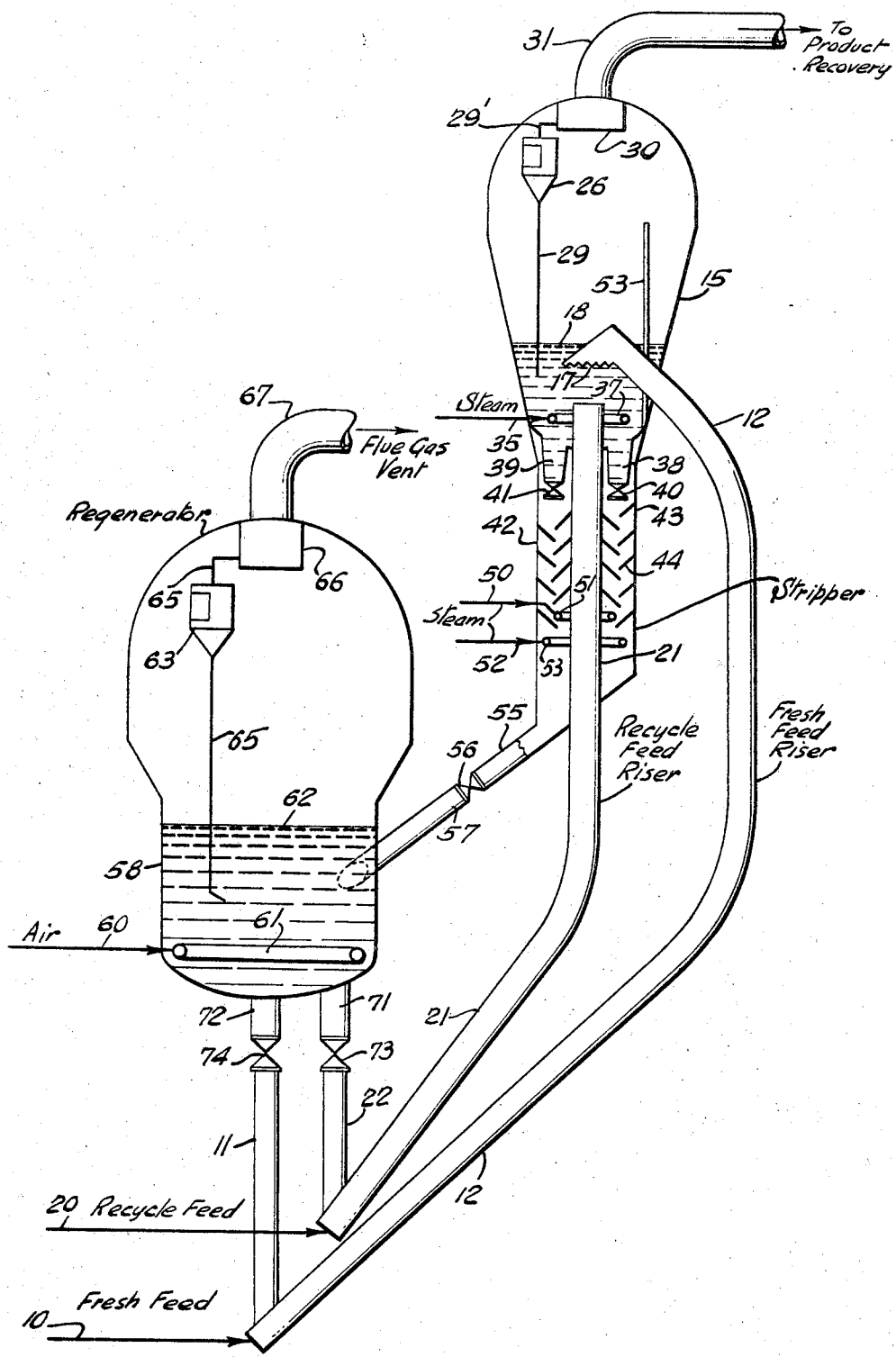

3,433,733
METHOD AND APPARATUS FOR FLUID CATALYTIC CRACKING
Dorrance P. Bunn, Jr., Henry B. Jones and Richard E. Nagle, Houston, Tex., assignors to Texaco Inc., New York, N.Y., a corporation of Delaware
Filed Dec. 1, 1966, Ser. No. 598,281
U.S. Cl. 208—150                     9 Claims
Int. Cl. C10g *11/18;* B01j *9/20*

ABSTRACT OF THE DISCLOSURE

This invention relates to an improved method and apparatus for fluid catalytic cracking of hydrocarbon oils. More particularly, this invention relates to fluid catalytic cracking of at least one feed stock in a frusto-conic reaction zone with attendant stripping and regeneration of the catalyst.

Cross-references to related applications

The method and apparatus of this invention may incorporate the improvements in catalyst regeneration disclosed and claimed in the application of Dorrance P. Bunn, Jr., and Henry B. Jones entitled, "Method and Apparatus for the Regeneration of Catalyst in the Fluid Catalytic Cracking Process," Ser. No. 603,834, filed Dec. 22, 1966 now U.S. 3,394,076 issued July 23, 1968.

Summary of invention

In the fluid catalytic cracking process hydrocarbon conversion is effected under conditions effecting conversion of a portion of the hydrocarbon feed to desired products with the concomitant deposition of coke on the catalyst. Catalyst is withdrawn from the reaction zone and passed to a stripping zone wherein occluded and accompanying hydrocarbons are displaced from the catalyst by means of a stripping medium such as steam. The stripping medium and removed hydrocarbons are passed into the reaction zone and stripped catalyst is withdrawn to a regeneration zone wherein the catalyst is contacted with an oxygen-containing gas effecting combustion of at least a portion of said coke and regeneration of the catalyst. Regenerated catalyst is then passed to the reaction zone and therein contacted with additional hydrocarbon.

In accordance with the present application, at least a portion of the reaction is effected in a tapered reaction chamber having a greater diameter at its upper portion than at the lower portion thereby forming a frusto-conic reaction zone. Accordingly, means are provided to introduce successive vapor streams into the reaction zone at different levels without encountering excessive variation in vapor velocity between the top and bottom of the bed in the reaction zone. Additionally, the tapered reaction zone permits the application of a small amount of stripping medium in the convergent section of the zone whereby a pre-striping step is effected in the reactor before discharging the catalyst into a separate stripping zone and more effective overall stripping is obtained and a reduced amount of hydrocarbon and carbonaceous material is passed to the regeneration zone.

The reaction zone as mentioned above is in the form of a frustum of a cone having a greater diameter at its upper portion. Hydrocarbon feed is introduced into the lower portion of said reaction zone through one or more riser conduits and a stripping medium is introduced into the lower portion of said reaction zone at the point of withdrawal of catalyst and below the point of introduction of said hydrocarbon stream. Catalyst withdrawn from the reaction zone is passed to a separate stripping chamber wherein it is contacted with a stripping medium, for example, steam. Gaseous effluent comprising hydrocarbon displaced from the catalyst and the stripping medium is discharged from the separate stripping zone through a vapor conduit which in turn discharges into the reaction zone at a point above the point at which said hydrocarbon stream is introduced into said reaction zone.

Advantageously, a second hydrocarbon stream is introduced into the reaction zone through a second riser conduit discharging at a point above that at which the first named hydrocarbon stream is introduced and below the point at which said gaseous effluent from said separate stripping zone is introduced into said reaction zone. When two hydrocarbon streams are introduced into the reaction zone, the stream introduced into the lower portion of the zone is directed upwardly and the second hydrocarbon stream introduced at a higher level is directed downwardly into said reaction zone. One of the streams introduced into the reaction zone may comprise a virgin gas oil cracking stock and the second hydrocarbon stream may be a stock having substantially different cracking characteristics, for example, a cycle gas oil or an extract from the solvent refining of a gas oil.

In the development of the fluid catalytic cracking process, it has been recognized that recycle stocks such as the cycle gas oil separated from the fluid catalytic cracking products is more refractory than virgin stocks such as the distillates from crude stilling operations. These more refractory recycle stocks are usually cracked under more severe conditions than virgin stocks. It has also been recognized that a short period of contact between the cracking stock and catalyst results in superior yields as compared to a longer period of poor contact.

Various apparatus configurations have been proposed to obtain different cracking conditions for fresh feed and recycle stocks and to achieve more intimate catalyst-oil contact. In one configuration, fresh feed is cracked in a transfer line reactor and recycle oil feed is injected into the dense phase bed of a second reaction zone which receives the catalyst from the transfer line reactor. A disadvantage of this operation is that the fresh feed riser must supply all of the heat for cracking both fresh and recycle feed and, as a result, the fresh feed may be overcracked with resultant loss in yield and stability of the gasoline produced.

In another apparatus configuration, the fresh feed is introduced into a dense phase reactor zone by a riser discharging above the dense phase bed while introducing cycle gas oil into the lower portion of the dense phase bed through another riser. In this case the superficial vapor velocity imparted by the recycle feed must be low in order to avoid excessive entrainment at the point at which the fresh feed stream is added.

In accordance with this invention a unique reactor riser configuration provides separate cracking of fresh feed and cycle gas oil streams at conditions which are optimum for each. At the same time, efficient conditions for contacting the catalyst and oil vapors are maintained throughout the entire system. In accordance with this arrangement, the reactor vessel is positioned adjacent to and above the regenerator vessel. Separate standpipes and risers are provided for fresh feed and recycle gas oils. The recycle gas oil riser enters the reactor through the center of the lower head which separates the reactor from a segregated or separate stripping zone. The fresh feed riser enters the reactor vessel at an intermediate point above the elevation of the recycle riser.

The reactor vessel is a conic section from a point at about the intersection of the wall with the lower interhead to a point above the fresh feed riser discharge and the vent from the separate stripping zone. The fresh feed riser then enters the reactor vessel through a tapered portion of the vessel wall.

Catalyst and reaction products disengage from each other in the upper portion of the reactor vessel with further separation being obtained through gas-solids separating means such as one or more stages of cyclone separators. The spent catalyst and entrained oil vapors are passed through standpipes equipped with slide valves into the separate stripping zone. Stripping medium, for example, steam, is introduced into the lower section of the stripper vessel and stripping medium plus stripped vapors leave the stripper through a vent line discharging into the reaction vessel above the fresh feed riser inlet.

The recycle riser enters the lower portion of the stripper and passes vertically upward through the center of the stripper and through the interhead into the reactor vessel. The vertical standpipe passing through the separate stripping zone forms an annular space within the stripping zone which is advantageously equipped with baffles. Catalyst descending through the stripping zone is countercurrently contacted with stripping medium to free the catalyst of occluded and entrained hydrocarbons. Stripped spent catalyst from the lower portion of the stripper flows through a standpipe to the regenerator where the carbonaceous deposit referred to as coke is burned from the catalyst with air.

An advantage of the use of the conic reactor of this invention in the configuration of apparatus described is that the expansion in cross-sectional area with height of the dense phase bed permits the establishment of a plurality of zones with different gross vapor loadings while maintaining substantially uniform fluidization conditions. For example, a lower zone employs a relatively small amount of stripping medium to effect the prestripping operation. Above the prestripping zone where the cross-sectional area of the reaction zone is greater a second vapor stream comprising a hydrocarbon feed stock is introduced as a vapor. In addition to the increase in vapor volume resulting from the successive introductions of a plurality of vapor streams, the cracking of heavy hydrocarbons to hydrocarbons of lower molecular weight results in an increase in the volume of products.

A further advantage of the apparatus configuration described is that the recycle feed may be introduced into the center of the reaction zone to obtain the best distribution of vapors across the reactor cross-sectional area and thus maximize the cracking reaction at a given set of conversion conditions. The apparatus configuration described also provides for the discharge of a second feed stock, for example, a virgin gas oil feed, at the center of the reactor cross section. The expanding reactor with introduction of a plurality of feed streams at various elevations permits the introduction of the fresh feed at a higher elevation in the reactor than the recycle gas oil to maximize cracking of the recycle stock by exposure to the catalyst while at the same time minimizing undesired overcracking and polymerization of the virgin feed reaction products. By introducing two feed stocks into a conic section reactor at points at various levels, it is possible to introduce both feed stocks at a point which provides high velocity contact for both while at the same time providing adequate disengaging in the lower velocity upper section of the reactor. Since the conic section permits the use of high velocities in the dense phase bed without exceeding satisfactory disengaging velocities in the upper section of the reactor, greater flexibility is achieved in that adequate velocities may be maintained for good fluidization at low vapor rates such as may be encountered during low conversion operations or operations at reduced throughput. A further advantage of the conic section reactor is that the fresh feed riser may be passed through the vessel wall at a shallower angle to the vertical than would be mechanically feasible if the shell were not tapered thereby achieving improved mechanical strength and joint efficiency. The conic reactor also encourages and facilitates catalyst flow into the standpipes during operation and in the course of unloading during shutdowns since the funnel shaped vessel provides for efficient fluidization with relatively small amounts of fluidizing medium. The accompanying figure illustrates and exemplifies one form of the method and apparatus by which the present invention may be practiced and it is not intended to restrict the invention thereby since modifications may be made within the scope of the claims without departing from the spirit thereof.

Referring to the figure, a virgin gas oil feed in line 10 is contacted with hot regenerated catalyst from standpipe 11 at a temperature of about 1200° F. in the inlet portion of fresh feed riser 12. The resulting suspension of catalyst in oil vapor at a temperature of about 920° F. and at an average velocity of about 33 feet per second passes upwardly through feed riser 12 and into tapered reactor 15. Fresh feed riser 12 terminates in a downwardly directed outlet having a serrated edge 17. The purpose of the serrated edge 17 is to provide smooth flow of the hydrocarbon vapors from conduit 12 into reactor 15 particularly when dense bed level 18 fluctuates near the outlet of riser 12 as defined by the serrated edge 17. Conditions prevailing in the fresh feed riser include a catalyst to oil ratio of 5.6 and a weight hourly space velocity of 69.5. The vapor velocity in fresh feed riser is about 40 feet per second providing a residence time of about 4.0 seconds. Substantial conversion of the fresh feed occurs in the riser and at these conditions amounts to a conversion of 32 weight percent of the fresh feed to products boiling below 430° F.

An intermediate cycle gas oil fraction separated from the cracked products in fractionation equipment not shown having a gravity of about 22° API and an end point of about 725° F. is introduced through line 20 into the inlet section of cycle gas oil riser 21 wherein it is contacted with hot catalyst from standpipe 22. The resulting catalyst-vapor mixture at a temperature of about 920° F. passes upwardly through cycle gas oil riser 21 at an average velocity of about 28 feet per second with an average residence time of about 5.0 seconds. Other conditions in the recycle riser include a catalyst to oil ratio of 6.2 and a weight hourly space velocity of 51.8. About 16% of the cycle gas oil is converted to products boiling below 430° F. by the time the products are discharged through the outlet of riser 21 into the lower portion of reactor 15.

The effluent of the cycle gas oil riser passes upwardly through the dense phase bed in reactor 15 effecting further conversion of the cycle gas oil to 39 percent of products boiling below 430° F. Other conditions in the bed in reactor 15 include a catalyst to oil ratio of 12.3 and a weight hourly space velocity of 3.0. The combined fresh feed riser cracking, recycle riser cracking and reactor bed cracking provide an overall conversion of 70 volume percent of the fresh feed to products boiling below 430° F. The vapor velocities in the reactor are 1.7 feet per second at the point at which the recycle riser discharges, 3.1 feet per second at the point where the fresh feed discharges and 1.5 feet per second in the upper portion at the cyclone inlets.

Cracked products disengage from the catalyst in dense phase bed at level 18 at a vapor velocity of about 3.1 feet per second, which velocity continues to drop as the vapors pass upwardly toward cyclone 26. The vapors and any entrained catalyst pass through cyclone 26 wherein entrained catalyst is separated and returned to the bed through dipleg 29. Although a single cyclone is shown for clarity, it will be understood that several cyclones may be assembled in series to achieve substantially complete separation and a plurality of such assemblies may be employed to handle the volume of vapor encountered. Effluent gases pass from cyclone 25 through line 29 to plenum chamber 30 wherein the gases from other cyclone assemblies, not shown, are collected and discharged from the reactor through line 31. Vapor line 31 conveys the cracked products to fractionation facilities, not shown, wherein the conversion products are recovered and separated into desired products and recycle streams by compression, absorption and distillation facilities well known in the art.

Steam in line 35 is passed to steam ring 37 and discharges into the lower portion of reactor 15 at a point just below the outlet of recycle riser 21. Dense phase catalyst in the lower portion of reactor 15 is stripped by steam from ring 37 and passes downwardly through standpipes 38 and 39 and slide valves 40 and 41 into stripping zone 42. Stripping zone 42 is provided with baffles 43 attached to riser 21 and baffles 44 attached to the wall of stripper 42. Steam in line 50 is discharged through steam ring 51 into the lower portion of stripper 42 under baffles 43 and through line 52 and steam ring 53 under baffles 44. Steam rising through stripper 42 displaces and removes occluded and entrained hydrocarbon vapors which pass upwardly through stripper vent line 53 discharging into the upper portion of reactor 15.

Stripped catalyst is withdrawn from the bottom of stripper 42 through spent catalyst standpipe 55 at a rate controlled by slide valve 56 and discharges through standpipe 57 into regenerator 58. In regenerator 58 the spent catalyst is contacted with air introduced through line 60 and air ring 61. Catalyst undergoing regeneration in regenerator 58 forms a dense bed having a top level 62. In regenerator 58 carbon on the surface of the catalyst is burned and the resulting flue gas passes upwardly and enters cyclone 63 wherein entrained catalyst is separated and returned to the regenerator dense bed through dipleg 65. Cyclone 63 although represented as a single vessel may, of course, comprise an assembly of cyclones arranged in parallel and in series to effect substantially complete separation of entrained solids from the flue gas. Effluent flue gas from cyclone 63 is passed through line 65 into plenum chamber 66 and outwardly through flue gas line 67 to vent facilities, not shown, which may include means to recover heat from the hot flue gases, means to utilize unconsumed carbon monoxide by the generation of additional heat and means to recover energy by the generation of steam or by expansion through turbines with the generation of power as is well known in the art. Regenerated catalyst is withdrawn from the bottom of regenerator 58 through lines 71 and 72 at rates controlled by slide valves 73 and 74 to supply the hot regenerated catalyst to standpipes 22 and 11 as described above.

We claim:
1. An apparatus for fluid catalytic cracking comprising:
a tapered reactor chamber having a greater diameter at the upper portion than at the lower portion,
a stripping chamber,
a regenerator chamber,
at least one riser conduit discharging into an intermediate tapered portion of said reactor chamber,
means to introduce steam into the lower tapered portion of said reactor chamber,
a vapor conduit extending from the upper portion of said stripping chamber and discharging into the upper tapered portion of said reactor chamber,
means to withdraw gaseous products and steam from the upper portion of said reactor chamber,
means to withdraw solids from said reactor chamber from a point below said means to introduce steam into said reactor chamber and to discharge the same into said stripping chamber,
means to introduce steam into the lower portion of said stripping chamber,
means to withdraw solids from the lower portion of said stripping chamber and to discharge the same into said regenerator chamber,
means to introduce combustion gas into the lower portion of said regenerator chamber,
means to withdraw flue gas from the upper portion of said regenerator chamber,
means to withdraw regenerated catalyst from said regeneration chamber and to discharge the same into the inlet of said riser conduit, and
means to introduce oil feed into the inlet of said riser conduit.

2. The apparatus of claim 1 including a second riser conduit discharging into said reaction chamber intermediate the point at which said first named riser conduit discharges into said reactor chamber and the point at which said conduit extends from said stripping chamber discharges into said reaction chamber,
means to withdraw regenerated catalyst from said regeneration chamber and to discharge the same into the inlet of said second riser conduit, and
means to introduce a second oil feed into the inlet of said second riser conduit.

3. The apparatus of claim 1 wherein said stripping chamber is disposed concentric with and below said reactor chamber.

4. The apparatus of claim 3 wherein said riser conduit passes concentrically through said stripping chamber.

5. The apparatus of claim 2 wherein said second riser conduit passes through the tapered wall of said reactor chamber and terminates in a downwardly directed outlet.

6. In a fluid catalytic cracking process wherein at least one hydrocarbon stream is contacted with a fluidized cracking catalyst in a reaction zone effecting conversion of at least a portion of said hydrocarbon to desired products with the concomitant deposition of coke on said catalyst, catalyst is withdrawn from the lower portion of said reaction zone and passed to a separate stripping zone wherein it is contacted with a stripping medium effecting displacement of occluded and accompanying hydrocarbon from said catalyst, stripped catalyst is passed to a regeneration zone wherein it is contacted with an oxygen containing gas effecting combustion of at least a portion of said coke and regeneration of said catalyst, and regenerated catalyst is passed to said reaction zone, the improvement which comprises:
establishing and maintaining said reaction zone as a frustum of a cone having a greater diameter at its upper portion,
introducing said hydrocarbon stream into the lower conic portion of said reaction zone,
introducing stripping medium into the lower conic portion of said reaction zone at the point of withdrawal of said catalyst from said reaction zone and below the point of introduction of said hydrocarbon stream into said reaction zone effecting prestripping of said catalyst,
withdrawing stripping medium and displaced hydrocarbons as gaseous effluent from said separate stripping zone, and
passing said gaseous effluent from said stripping zone into said conic reaction zone at a point above that at which said hydrocarbon stream is introduced into said reaction zone.

7. The process of claim 6 wherein a second hydrocarbon stream is introduced into said reaction zone at a point above that at which said first named hydrocarbon stream is introduced into said reaction zone and below the point at which said gaseous effluent from said separate stripping zone is introduced into said reaction zone.

8. The process of claim 7 wherein said first named hydrocarbon stream is directed upwardly into said reaction zone and said second hydrocarbon stream is directed downwardly into said reaction zone.

9. The process of claim 7 wherein said first named hydrocarbon stream comprises virgin gas oil cracking stock and said second hydrocarbon stream comprises cycle gas oil.

References Cited

UNITED STATES PATENTS

| | | | |
|---|---|---|---|
| 2,457,232 | 12/1948 | Hengstebeck | 208—164 |
| 2,665,976 | 1/1954 | Rhys | 23—288.3 |
| 2,994,659 | 8/1961 | Slyngstad et al. | 23—288 |
| 3,053,641 | 9/1962 | Nagy et al. | 23—288 |
| 3,142,543 | 7/1964 | Slyngstad et al. | 208—164 |
| 3,188,184 | 6/1965 | Rice et al. | 23—288 |
| 3,188,185 | 6/1965 | Slyngstad et al. | 208—164 |

HERBERT LEVINE, *Primary Examiner.*

U.S. Cl. X.R.

23—288; 208—163, 164